United States Patent
Grubert et al.

(10) Patent No.: US 10,005,211 B2
(45) Date of Patent: Jun. 26, 2018

(54) MOLDABLE WIRE THREAD INSERT, METHOD FOR ITS PRODUCTION, COMPONENT WITH A MOLDABLE WIRE THREAD INSERT AS WELL AS A METHOD FOR ITS PRODUCTION

(71) Applicants: Klaus Friedrich Grubert, Bückeburg (DE); Michael Stumpf, Bielefeld (DE); Xavier Sutz, Voglans (FR); Jochen Rintelmann, Dessau-Rosslau (DE)

(72) Inventors: Klaus Friedrich Grubert, Bückeburg (DE); Michael Stumpf, Bielefeld (DE); Xavier Sutz, Voglans (FR); Jochen Rintelmann, Dessau-Rosslau (DE)

(73) Assignee: Böllhoff Verbindungstechnik GmbH (DE)

( * ) Notice: Subject to any disclaimer, the term of this patent is extended or adjusted under 35 U.S.C. 154(b) by 493 days.

(21) Appl. No.: 14/498,337

(22) Filed: Sep. 26, 2014

(65) Prior Publication Data
US 2015/0014466 A1    Jan. 15, 2015

Related U.S. Application Data

(62) Division of application No. 13/499,854, filed as application No. PCT/EP2010/006053 on Oct. 4, 2010, now Pat. No. 8,931,991.

(30) Foreign Application Priority Data

Oct. 2, 2009 (DE) ......................... 10 2009 048 160

(51) Int. Cl.
*B29C 45/14* (2006.01)
*F16B 37/12* (2006.01)
(Continued)

(52) U.S. Cl.
CPC .. *B29C 45/14065* (2013.01); *B29C 45/14549* (2013.01); *B65H 54/00* (2013.01);
(Continued)

(58) Field of Classification Search
CPC .... F16B 37/122; F16B 37/125; F16B 37/127; B21F 3/04; B21F 3/10; B21F 35/02; B21C 47/04
(Continued)

(56) References Cited

U.S. PATENT DOCUMENTS 1,561,119 A    11/1925 Smith ............................. 464/60
2,138,919 A    12/1938 Herman ....................... 439/687
(Continued)

FOREIGN PATENT DOCUMENTS

CN    2380735 Y    5/2000
CN    2380737 Y    5/2000
(Continued)

OTHER PUBLICATIONS

International Preliminary Report on Patentability for PCT Application No. PCT/EP2010/006053; dated Apr. 11, 2012: 9 pages.
(Continued)

*Primary Examiner* — Teresa M Ekiert
*Assistant Examiner* — Gregory Swiatocha
(74) *Attorney, Agent, or Firm* — Barclay Damon, LLP

(57) ABSTRACT

A moldable wire thread insert for reinforcing a screw-in opening of a component has the following characteristics: a cylindrical spiral made of a helically, wound wire, the neighboring coils of which are arranged such that a closed cylindrical spiral wall is present, while at least one end of the cylindrical spirals has a fastening flange, which extends radially outwards over the cylindrical spiral wall and with which the wire thread insert is anchorable in the component and/or one end of the cylindrical spiral is designed in a (Continued)

Figure 1:
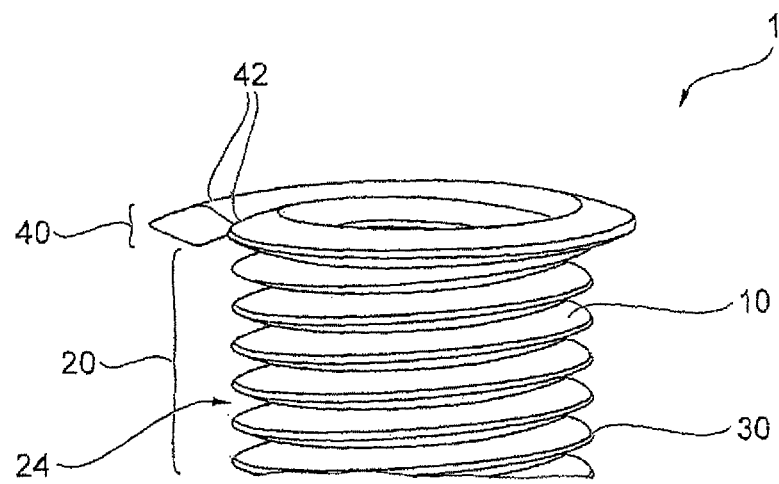

planar manner in order to form an even axial front surface of the cylindrical spiral.

14 Claims, 11 Drawing Sheets

(51) Int. Cl.
*B65H 54/00* (2006.01)
*B21F 3/04* (2006.01)
*B29L 9/00* (2006.01)
*B29L 31/00* (2006.01)

(52) U.S. Cl.
CPC .............. *F16B 37/127* (2013.01); *B21F 3/04* (2013.01); *B29C 2045/1495* (2013.01); *B29L 2009/005* (2013.01); *B29L 2031/727* (2013.01)

(58) Field of Classification Search
USPC .................. 140/103; 470/8, 10, 18, 905; 72/135–137, 142, 143
See application file for complete search history.

(56) References Cited

U.S. PATENT DOCUMENTS

| | | | |
|---|---|---|---|
| 2,306,806 A | 12/1942 | Hoopes | 411/289 |
| 2,672,070 A | 3/1954 | Forster | |
| 2,874,741 A | 2/1959 | Brancato | 411/262 |
| 3,031,004 A * | 4/1962 | Brancato | B21F 3/04 |
| | | | 29/456 |
| 3,156,761 A | 11/1964 | Schinske | 174/87 |
| 3,272,250 A | 9/1966 | Hattan | |
| 3,371,697 A * | 3/1968 | James | F16B 39/06 |
| | | | 411/110 |
| 3,440,333 A * | 4/1969 | Blomstrand | H01R 4/22 |
| | | | 174/87 |
| 3,459,248 A | 8/1969 | Waller | 411/262 |
| 3,480,060 A | 11/1969 | Sheldon | 411/262 |
| 3,880,041 A * | 4/1975 | Markowski | F16B 37/12 |
| | | | 411/34 |
| 3,945,070 A | 3/1976 | Hauser | |
| 4,588,175 A * | 5/1986 | Martin | F16F 1/16 |
| | | | 267/155 |
| 4,645,398 A | 2/1987 | Cosenza et al. | |
| 5,961,266 A | 10/1999 | Tseng | 411/383 |
| 6,146,073 A | 11/2000 | Kobusch | 411/178 |
| 6,561,913 B2 * | 5/2003 | Giannakakos | B21F 3/02 |
| | | | 470/20 |
| 6,969,221 B2 * | 11/2005 | Schultz | F16B 37/125 |
| | | | 411/110 |
| 2001/0014263 A1 * | 8/2001 | Giannakakos | F16B 37/12 |
| | | | 411/432 |
| 2005/0095083 A1 | 5/2005 | Masuda | 411/438 |
| 2007/0140810 A1 * | 6/2007 | Itou | F16B 37/12 |
| | | | 411/251 |
| 2008/0008557 A1 * | 1/2008 | Bucciero | F16B 37/12 |
| | | | 411/438 |
| 2010/0221087 A1 * | 9/2010 | Gillis | F16B 37/12 |
| | | | 411/438 |

FOREIGN PATENT DOCUMENTS

| | | |
|---|---|---|
| CN | 2402862 Y | 10/2000 |
| DE | 20 2006 012 713 U1 | 11/2006 |
| EP | 0 090 698 A1 | 10/1983 |
| EP | 0 202 189 B1 | 1/1990 |
| EP | 1 046 446 A1 | 10/2000 |
| GB | 610 869 | 10/1948 |
| JP | 15-3901 U | 4/1940 |
| WO | WO 2005/124165 A1 | 12/2005 |
| WO | WO 2007/147196 A1 | 12/2007 |
| WO | WO 2011/038939 A1 | 4/2011 |

OTHER PUBLICATIONS

International Search Report/Written Opinion for PCT Application No. PCT/EP2010/006053; dated Jan. 20, 2011; 10 pages.

* cited by examiner

MOLDABLE WIRE THREAD INSERT, METHOD FOR ITS PRODUCTION, COMPONENT WITH A MOLDABLE WIRE THREAD INSERT AS WELL AS A METHOD FOR ITS PRODUCTION

CROSS REFERENCE TO RELATED APPLICATION

This application is a divisional application of U.S. Ser. No. 13/499,854, filed Aug. 24, 2012, which is a national stage application of PCT/EP2010/006053, filed Oct. 4, 2010, which claims priority upon German Patent Application No. 10 2009 048 160.5, filed Oct. 2, 2009, the entire contents of each application herein being incorporated by reference.

FIELD OF THE INVENTION

The present invention relates to a moldable wire thread insert for reinforcing a screw-in opening of a component. Furthermore, the present invention is aimed at a method for producing the moldable wire thread insert as well as a component with this moldable wire thread insert. Moreover, the present invention relates to a production method for a component with this moldable wire thread insert.

BACKGROUND OF THE INVENTION

Wire thread inserts are generally known in the state of the art. These wire thread inserts are inserted into bore holes with internal threads in order to reinforce these bore holes. This is necessary for example when a screw to be fastened is made of a harder material than the component in which the bore hole is arranged and thus relaxation effects must be compensated for in the component material. These wire thread inserts are wound such that they have a greater inner diameter than that of the thread to be formed later in the bore hole. Moreover, the coils of the cylindrical spirals of the wire thread insert in the axial direction are separated from each other similar to a spring. In a spring-pretensioned state, the wire thread insert is inserted into a threaded bore hole so that it fastens itself in the threaded bore hole due to its effort to expand itself again. Such wire thread inserts are known for example from international patent application WO 2005/124165 A1.

Furthermore, wire thread inserts are known, in whose cylindrical spirals neighboring coils lie next to each other, so that the inner wall of the cylindrical spiral already provides a standard thread. The individual coils of the cylindrical spiral are designed sharp-edged on the radial outer wall of the cylindrical spiral so that the cylindrical spiral has a self-cutting, cylindrical outer wall. In the case of wire thread inserts formed in this manner, which are for example disclosed in international patent application WO 2007/147196 A1, it is no longer required to insert the wire thread insert into a prefabricated thread of a bore hole. Rather the wire thread insert cuts itself into the inner wall of the bore hole and is fastened in the component in this manner.

U.S. Pat. No. 2,672,070 and EP 1 046 446 B1 describe methods in which wire thread inserts are positioned in a component mold in order to mold them into the component during component production. The components are made for example of metal or plastic.

The types of wire thread inserts described above as well as the different methods for their use in a component bore hole have the disadvantage that, in the course of use of the component opening with wire thread insert, it loosens in the component opening and no longer sufficiently supports the screw fastened in it or a similar fastening element. In the worst case, the fastening element is no longer held in the component opening and can no longer fulfill its function. As a consequence, an exchange of the component or an enlargement of the component opening and an insertion of a new wire thread insert as well as the use of a fastening element with an adjusted diameter are required. This is complicated and partially constructively impossible. Furthermore, it is disadvantageous that such a retrofitting results in standstill times e.g. of a constantly used machine.

It is thus the object of the present invention to provide a moldable wire thread insert as well as a method for its production, which overcomes the disadvantages of the state of the art. Moreover, a method for producing a component with this molded wire thread insert should be provided.

SUMMARY OF THE PRESENT INVENTION

The above objects are solved through a moldable wire thread insert, a component with this moldable wire thread insert, a production method for a moldable wire thread insert, a production method for a component with this molded wire thread insert as well as through a winding spindle for producing the moldable wire thread insert in accordance with the claims. Advantageous embodiments and further developments of the present invention arise from the description, the drawings and the attached claims.

The moldable wire thread insert according to the invention for reinforcing a screw-in opening of a component has the following characteristics: a cylindrical spiral made of a helically, wound wire, the neighboring coils of which are arranged such that a closed cylindrical spiral wall is present, while at least one end of the cylindrical spiral has a fastening flange, which extends radially outwards over the cylindrical spiral wall and with which the wire thread insert is anchorable in the component and/or one end of the cylindrical spiral is designed in a planar manner in order to form an even axial front surface.

The moldable wire thread insert according to the invention is formed by a wire spiral wound on block. In this case, wound on block means that neighboring wire coils of the spiral are adjacent to each other such that an approximately closed spiral wall of the moldable wire thread insert is formed. In this manner, the wire coils form a permanent socket. The adjacency of the neighboring coils of the cylindrical spiral ensures that during a molding of the wire thread insert for example into a plastic component during injection molding no plastic can penetrate through the spiral wall into the inside of the wire thread insert. However, sufficient anchoring of the moldable wire thread insert in the plastic component is simultaneously ensured. This takes place on one hand via the radial cylindrical outer wall of the wire thread insert as well as via the fastening flange according to the invention on at least one end of the cylindrical spiral. This fastening flange projects outwards radially compared to the cylindrical spiral and is almost completely surrounded by the material of the component. In this manner, the fastening flange is anchored in the material of the component and prevents a twisting or other shift of the moldable wire thread insert in the component. In accordance with preferred embodiments of the present invention, the fastening flange is provided on only one or two ends of the cylindrical spiral. If the fastening flange is arranged on the cylindrical spiral on only one side, it also serves as a unique sort criterion for the automatic handling of the moldable wire thread insert.

It is preferred that the fastening flange comprises at least one flange coil of the wound wire, which has a reduced, preferably no, slope compared to the cylindrical spiral. In accordance with a further preferred embodiment, the fastening flange comprises at least two coils of the wound wire lying above each other in the radial direction of the cylindrical spiral.

The fastening flange of the moldable wire thread insert according to the invention consists of the same wound wire as the other cylindrical spiral. Since this wound wire on the end of the cylindrical spiral is just wound differently than the other wire thread insert, the wire thread insert according to the invention can be produced in an easy manner. The size of fastening flange is variable depending on the component material in which the moldable wire thread insert needs to be fastened. For this purpose, two coils lying above each other in the radial direction of the cylindrical spiral or also several coils are arranged for the formation of the fastening flange. The radially outer coil of the fastening flange is designed at least partially, preferably completely, circumferentially around the spiral.

In accordance with a further preferred embodiment of the present invention, the fastening flange comprises a first coil, which extends along a circumferential segment of the fastening flange starting at the end of the cylindrical spiral over an angle of at least 180°, preferably 180° to 270° and more preferably of 180° to 360°. In accordance with this embodiment, the first coil of the fastening flange is arranged outwards radially with respect to the circumference of the cylindrical spiral. However, this first coil does not extend along the entire circumference of the cylindrical spiral, i.e. over a circumferential or circular segment of 360°. Instead, the first coil runs along a circumferential segment of the fastening flange, which extends over an angle of at least 180°. This circumferential segment outwards radially related to the cylindrical spiral already ensures sufficient anchoring of the moldable wire thread insert during molding in a component to be produced. Moreover, a thusly designed fastening flange can also be used as sort criterion during the handling of the moldable wire thread inserts.

In accordance with a further preferred embodiment of the present invention, the fastening flange comprises a complete first coil and a second coil, which extends along a circumferential segment of the fastening flange starting at the end of the first coil over an angle of at least 180°, preferably 180° to 270° and more preferably of 180° to 360°. In accordance with this preferred embodiment, the second coil of the fastening flange is designed similarly to the first coil of the fastening flange described above, only that it connects to a completely circumferential first coil of the fastening flange.

In order to provide another anti-twist protection for the moldable wire thread insert as an addition to the fastening flange, preferably the cylindrical spiral wall on a radial outside has at least one groove running in the longitudinal direction of the cylindrical spiral, preferably a plurality of grooves. A cross-section of the wound wire of the wire thread insert is also preferably equipped outwards radially with respect to the cylindrical spiral with an angle contour with two flanks, which encloses an angle <60°, preferably an angle between 30° and 40°. With the help of this acute-angled contour on the outside of the cylindrical spiral, which anchors itself in the component material, sufficient resistance of the wire thread insert against shear loading is created depending on the size of the flank angle. This supports the fastening of the wire thread insert and its hold in the component. Moreover, radial tension on the wire thread insert is reduced by this shape. If the moldable wire thread insert has a preferred standard thread on its inside, then the wound wire has an asymmetrical cross-sectional profile due to the angle contour anchoring itself in the material on the radial outside of the cylindrical spiral.

In accordance with a further preferred embodiment, the end of the wire thread insert, which is arranged opposite the end with fastening flange, has a radially inwards projecting tang or a free through hole opening. In accordance with different alternatives of the preferred construction of the wire thread insert, this tang is removable or not. The tang supports a positioning of the wire thread insert on a pin during the production of a component with this moldable wire thread insert (see below).

The present invention also comprises a component consisting of plastic or metal, in which a moldable wire thread insert is molded in accordance with one of the alternatives described above.

Moreover, the present invention comprises a production method of a moldable wire thread insert for reinforcing a screw-in opening of a component. The production method comprises the following steps: winding of a wire into a cylindrical spiral with a diameter such that neighboring coils of the cylindrical spiral have a first slope and form a cylindrical spiral wall and creation of a fastening flange protruding radially outwards over the spiral wall on at least one end of the spiral or planar grinding of the cylindrical spiral on at least one end of the spiral, preferably cutoff grinding of the cylindrical spiral. The fastening flange is preferably created by the winding of at least one coil of the spiral without slope on one end of the spiral. It is furthermore preferred that at least two coils of the wound wire lying above each other in the radial direction are wound in order to form the fastening flange.

In a further embodiment of the aforementioned method, a winding of at least one coil of the spiral takes place on one end of the spiral with a slope reduced with respect to the first slope in order to form the fastening flange. The wire thread insert to be produced, which has the cylindrical spiral in one area and the at least one fastening flange in the end area of the cylindrical spiral, is wound with different slopes of the wire in the area of the fastening flange and in the area of the spiral. These different slopes are created among other ways in that during the winding a differently strong offset of the wire to be fed is used in relationship to the already wound wire thread insert. Coils with differently strong slopes in the area of the spiral and in the area of the fastening flange occur in this manner.

In accordance with a further embodiment of the present method, the winding of the fastening flange occurs such that the fastening flange has a greater diameter than the spiral. The end of the spiral preferably comprises at least two coils of the wound wire approximately lying above each other in the radial direction of the cylindrical spiral. It is also preferred to wind coils of the fastening flange over a circumferential segment, the shape of which was already described above.

It is also preferred to wind the wire onto a winding spindle, wherein the winding spindle comprises a first cylindrical area for the winding of the cylindrical spiral and an area second compared to the cylindrical area expanded in the radial direction for winding the fastening flange.

A winding spindle, which has two different areas when seen from the axial direction, is preferably used for the production of the moldable wire thread insert. In a first cylindrical area of the winding spindle, a thread is provided in order to wind onto it the cylindrical spiral of the later wire thread insert. A second area connects to this first cylindrical area, with the help of which the fastening flange is wound. In accordance with a first embodiment, the second area forms a ledge in comparison to the first area so that, during the winding, the wire is wound against this ledge. In accordance with a second embodiment, the second area is expanded in the radial direction in comparison with the first area so that, during the winding, the wire is wound on this expanded area. With respect to the expanded area of the winding spindle, it is also preferred that it expands constantly or gradually. Based on this shape of the winding spindle, the geometry of the fastening flange and/or the arrangement of the coils of the fastening flange are impacted.

It is furthermore preferred to wind the wire on the winding spindle such that a longitudinal axis of the winding spindle in the winding direction of the wire thread insert and a wire feed direction of the wire to be wound make up an angle $\beta \geq 90°$. With the help of this targeted angular adjustment between the wire feed direction and the longitudinal axis of the winding spindle in the winding direction, the wire of the wire thread insert to be produced is preferably provided with inner mechanical tensions. After the unspindling of the produced wire thread insert from the winding spindle, these embossed mechanical tensions ensure that the moldable wire thread insert is pulled together in the axial direction such that neighboring windings lie against each other. This applies preferably both for the coils of the cylindrical spirals as well as for the windings of the fastening flange. The moldable wire thread insert is thereby sealed outwardly so that no plastic can get inside the moldable wire thread insert in the case of a later molding of the moldable wire thread insert for example in the plastic. Moreover, a thread similar to a threaded bushing is designed on the inside of the cylindrical spiral. This thread is preferably a metric or imperial thread.

It is also preferred to shift the winding spindle and the feed position of the wire to be fed relative to each other with different values, while the wire is wound onto the first and the second area of the winding spindle. Also this different offset of the winding spindle in its longitudinal direction in relation to the feed direction or respectively the feed position of the wire to be wound also impacts how neighboring coils of the cylindrical spiral and of the fastening flange lie against each other after an unspindling of the produced wire thread insert.

It is furthermore preferred to produce the moldable wire thread insert with a radially inwards sticking tang with respect to the cylindrical spiral. For this purpose, the production method preferably comprises a hooking in of the wire to be wound into a notch of the winding spindle and creation of the radially inwards sticking tang on the end of the spiral facing away from the flange onto the winding spindle through the winding up of the wire.

Furthermore, the present invention comprises a production method for a component with a molded wire thread insert, which has a cylindrical spiral formed from a helically, wound wire, of which at least one end comprises a fastening flange, which extends radially outwards over the cylindrical spiral. The component to be produced is made of plastic, metal or other suitable material. In the case of metal components, light metals such as aluminum, magnesium or the like are preferably used. The aforementioned production method has the following steps: The positioning of the wire thread insert on a pin, arrangement of the pin with wire thread insert in a mold such that the fastening flange is arranged adjacent to a component surface after the demolding of the component from the mold, filling of the mold with metal or plastic and demolding of the component with wire thread insert from the mold.

In order to be able to suitably position the wire thread insert, it is preferably spindled onto the pin, which has a thread fitting the wire thread insert for this purpose. In accordance with another alternative, it is preferred to mount the wire thread insert on the pin without a thread. The pin with wire thread insert is then arranged in the mold and fastened so that, during the introduction of the material of the component, the positioned wire thread insert retains its position.

Should the wire thread insert have a radially inward protruding tang on the end of the wire thread insert facing away from the fastening flange as a positioning aid, it serves for example as a stop during mounting of the wire thread insert on the pin without thread.

Furthermore, the present invention comprises a winding spindle for winding a moldable wire thread insert, which has the following characteristics: a first cylindrical area with a thread and a second area, which is expanded in the radial direction compared to the first area, so that the fastening flange of the moldable wire thread insert is producible with the help of the second area. In accordance with a further embodiment of the winding spindle, the second expanded area is always or gradually expanded compared to the first area or it is designed as a single level and represents a ledge compared to the first cylindrical area. The second area is thus preferably arranged at an angle of 90° to 120° to the longitudinal axis of the winding spindle.

In accordance with a preferred embodiment, a notch is provided on one end of the first cylindrical area, in which a wire to be wound is fastened in order to form a radially inward sticking tang during the winding of the wire thread insert.

SHORT DESCRIPTION OF THE ACCOMPANYING DRAWINGS

Figure 2:
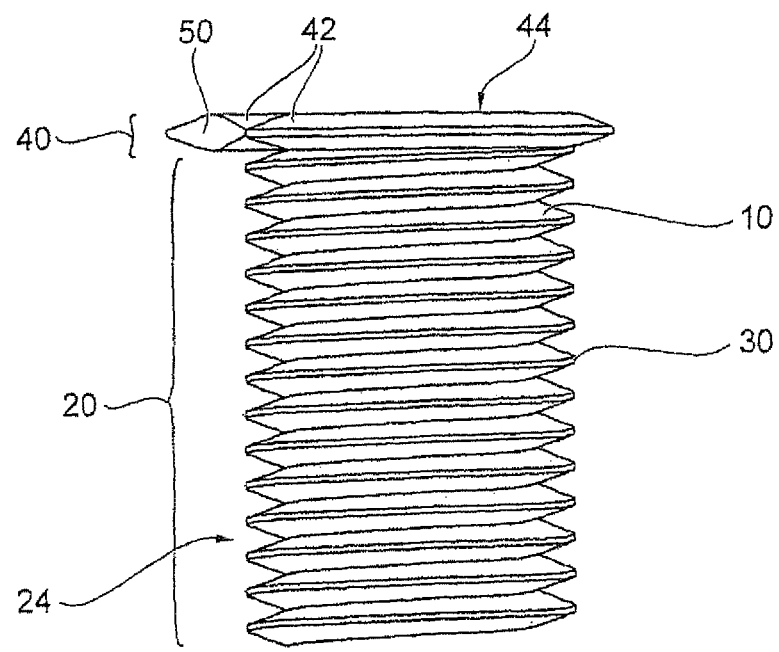
Figure 3:
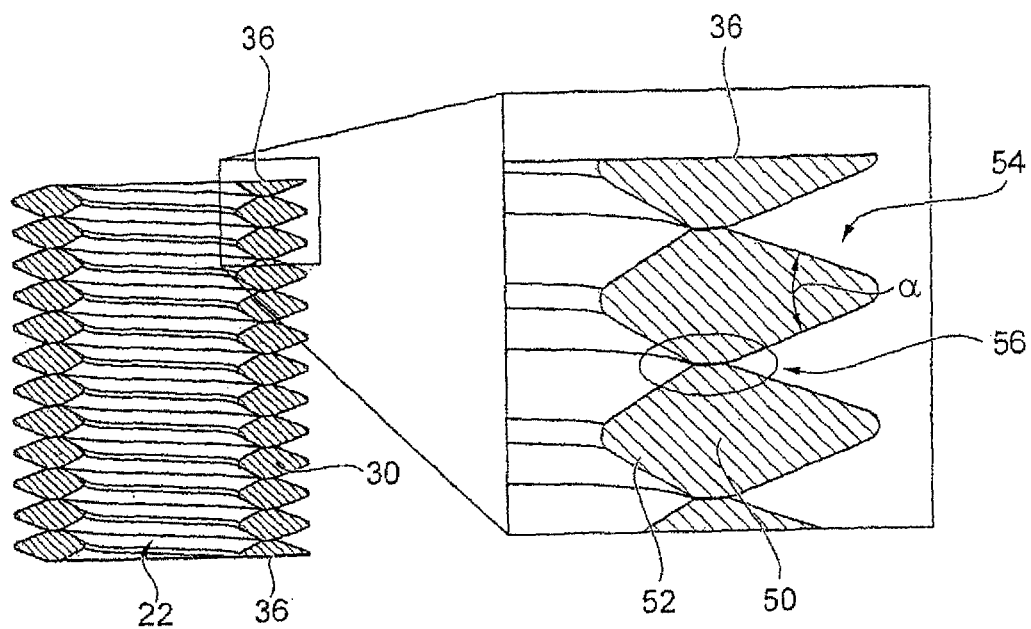
Figure 4:
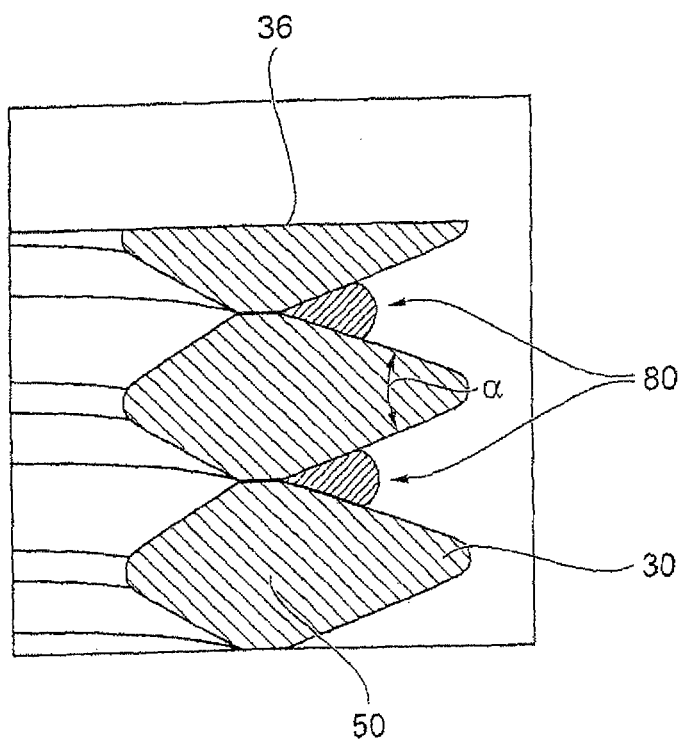
Figure 5:
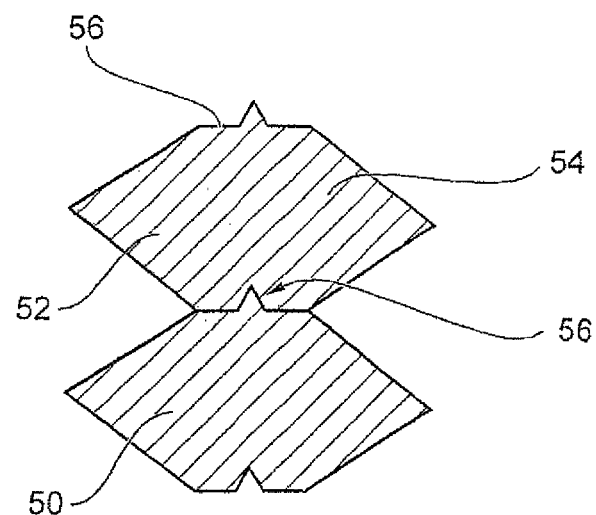
Figure 6:
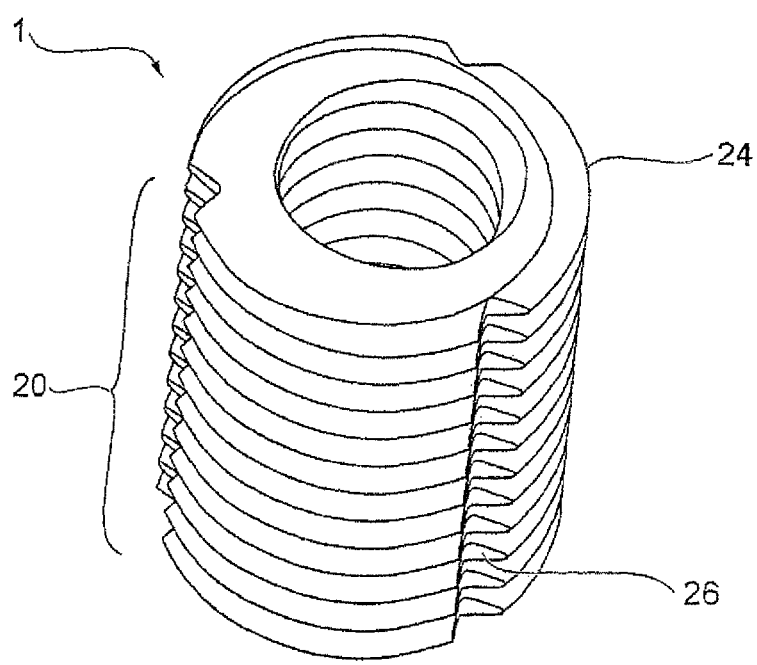
Figure 7:
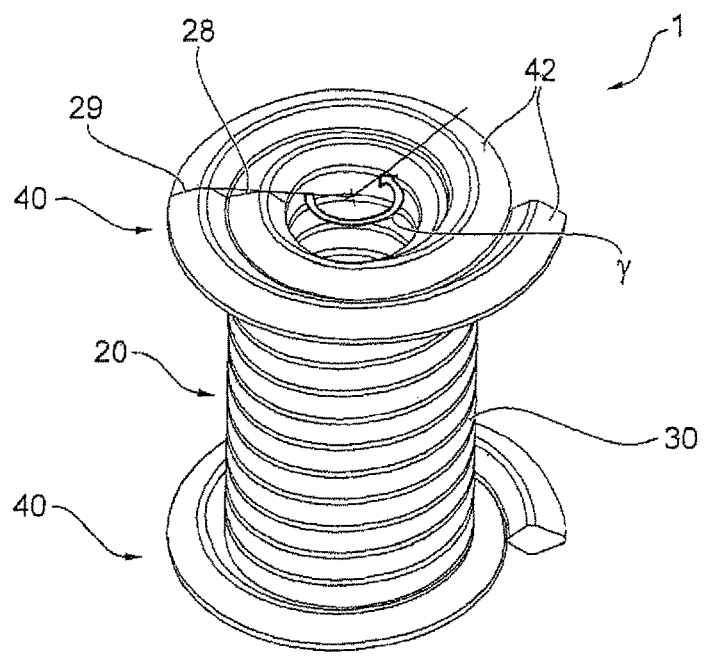
Figure 8:
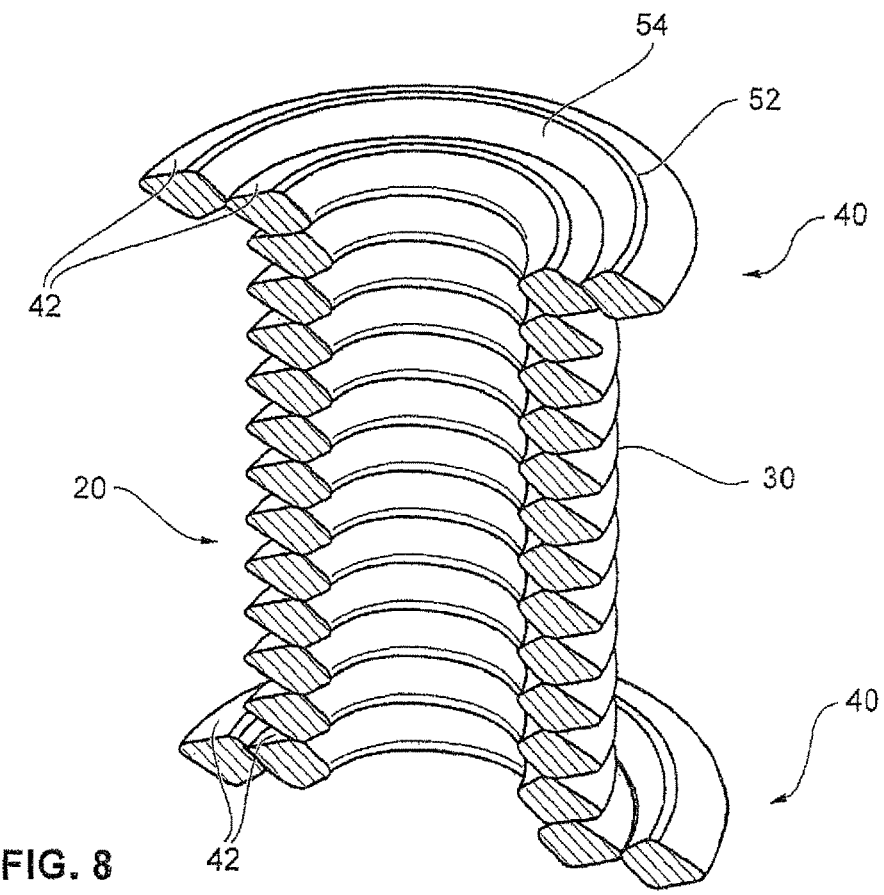
Figure 9:
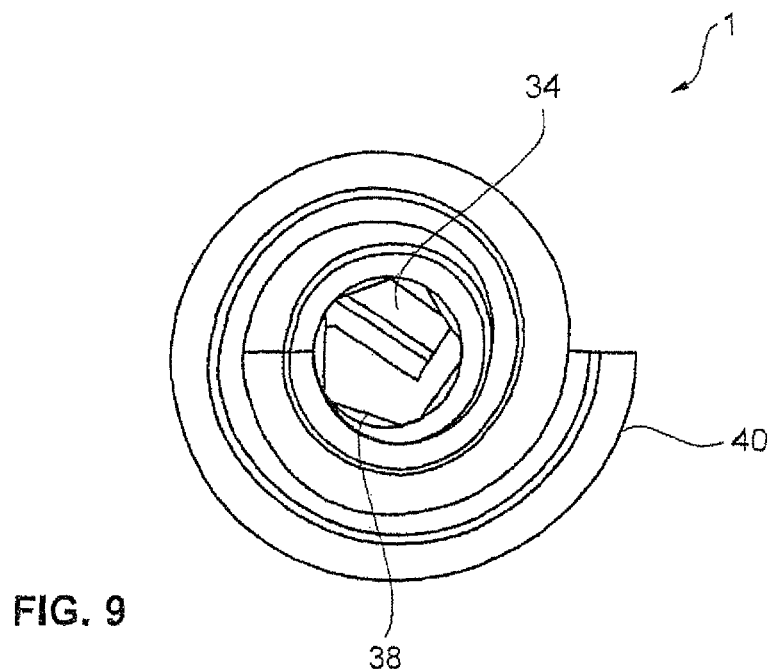
Figure 10:
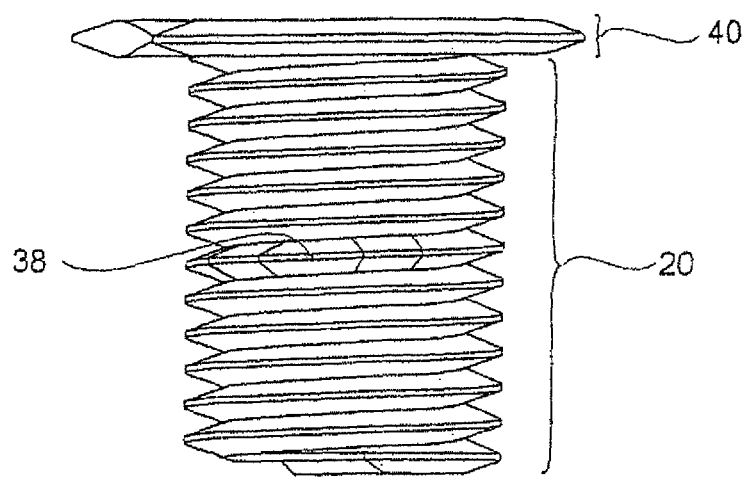
Figure 11:
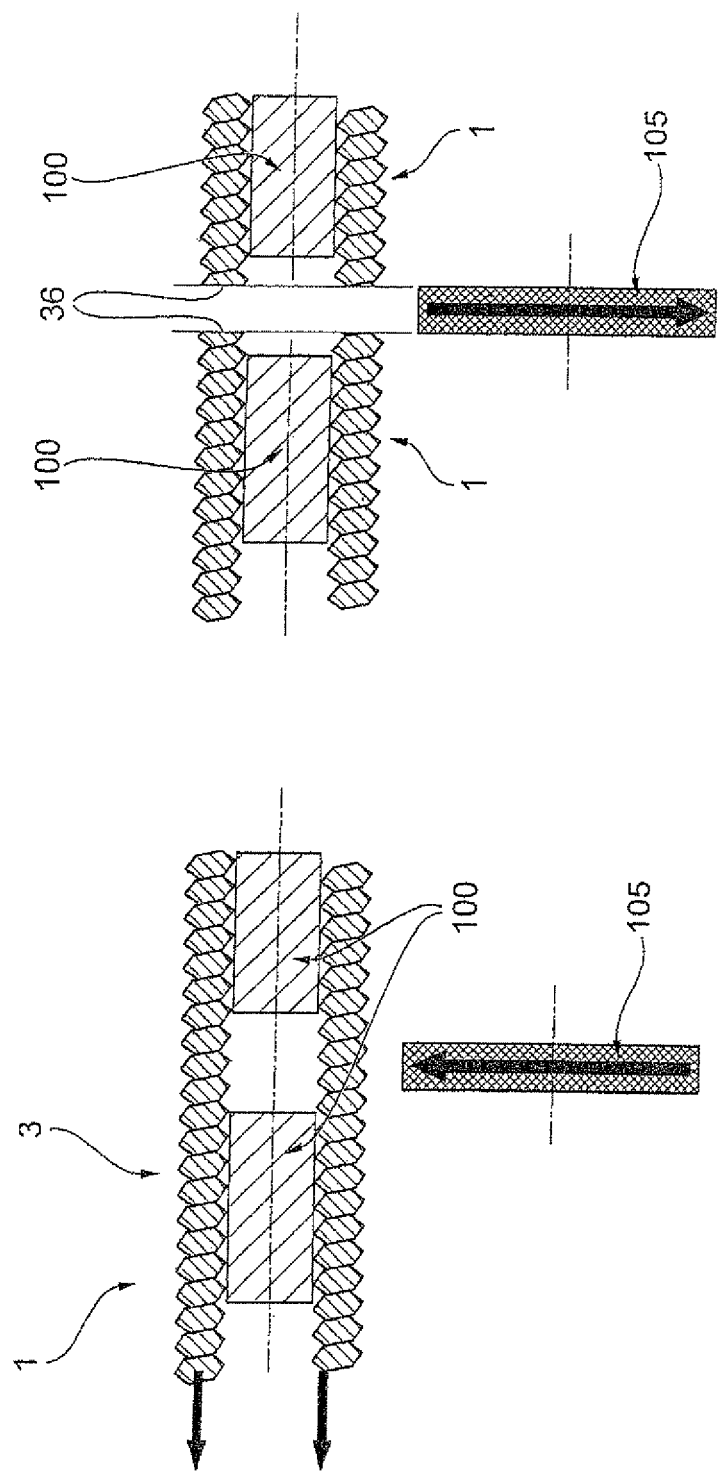
Figure 12:
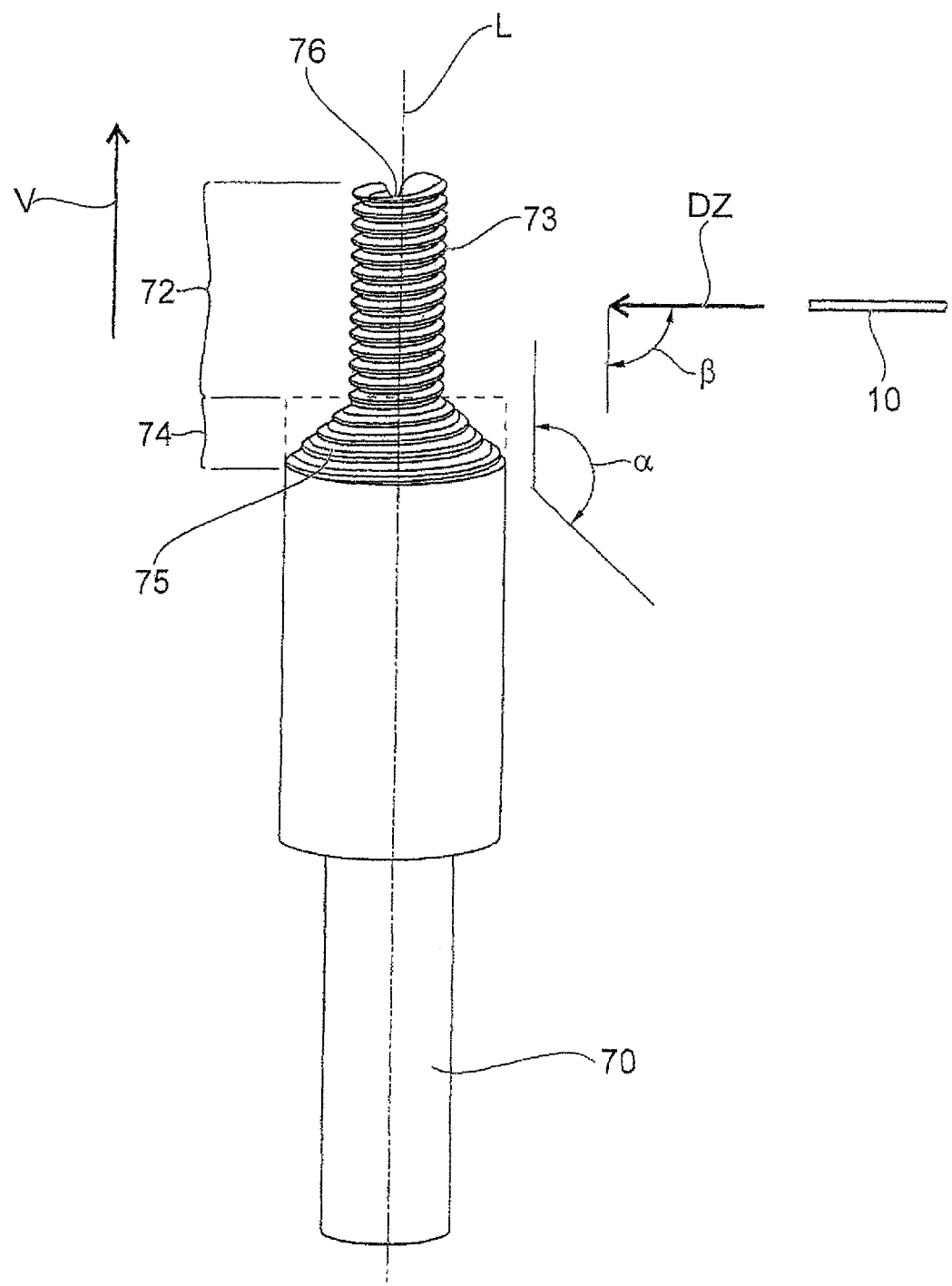
Figure 13A:
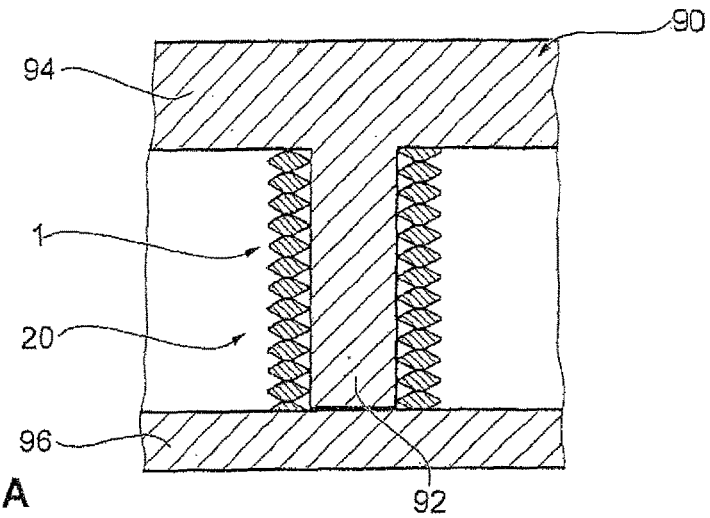
Figure 13B:
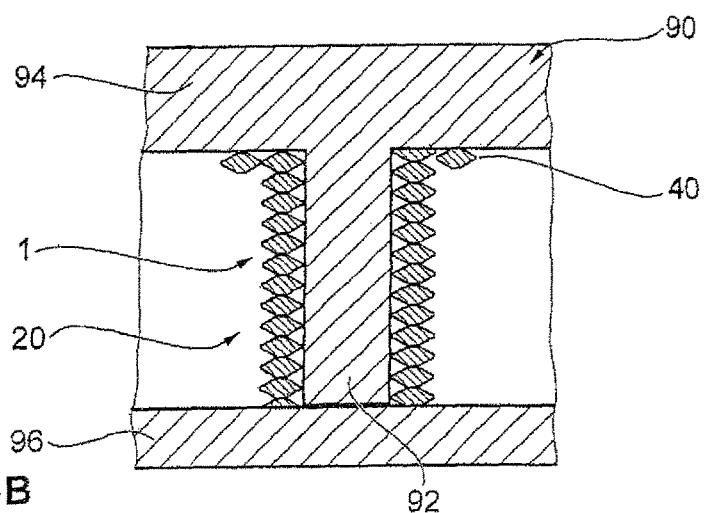
Figure 13C:
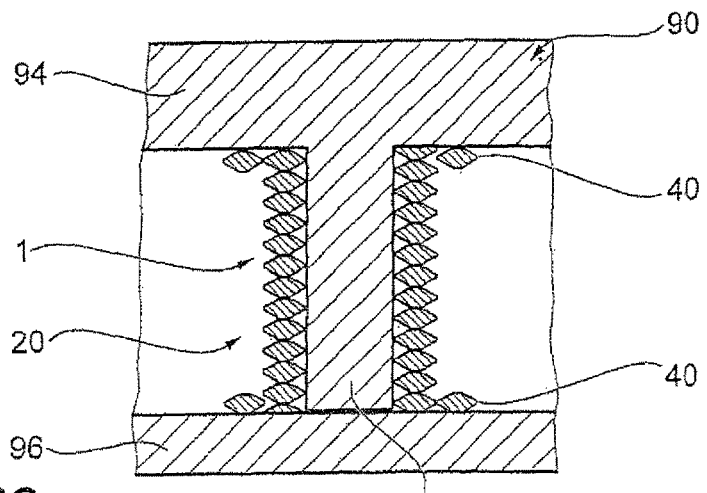
Figure 14:
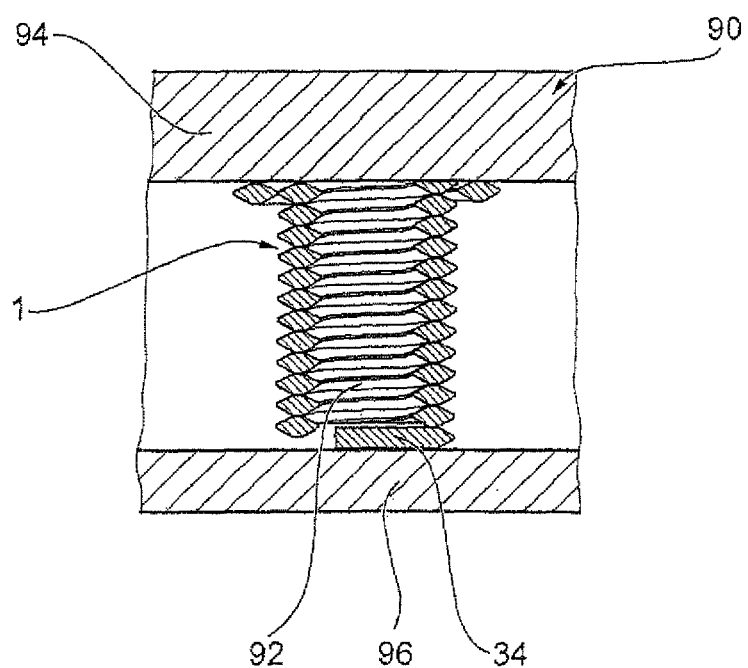
Figure 15:
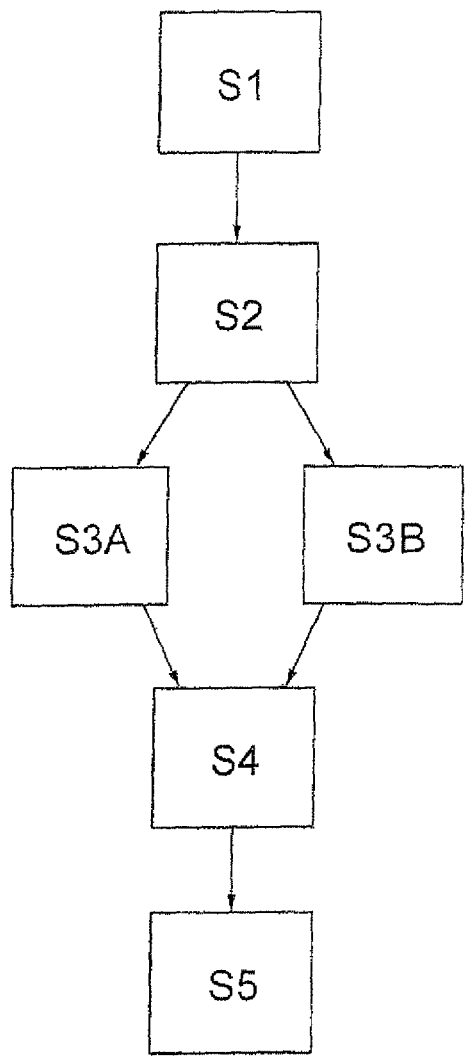
Figure 16:
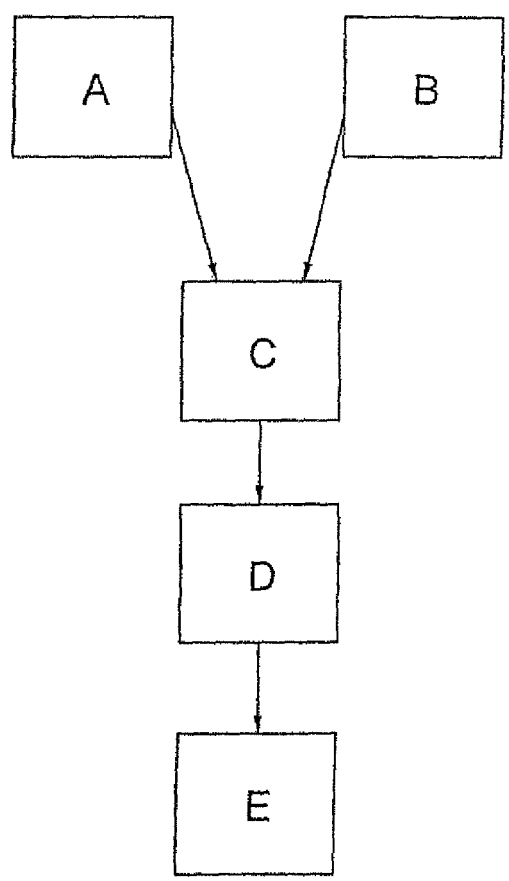

The preferred embodiments of the present invention are explained in greater detail in reference to the accompanying drawings, in which:

FIG. 1 is a perspective view of a preferred embodiment of a wire thread insert with fastening flange, FIG. 2 is a side view of the embodiment in FIG. 1, FIG. 3 is a cut representation with sectional enlargement of a preferred wire thread insert with surface-ground ends, FIG. 4 is a further sectional representation of a wire thread insert, FIG. 5 is a schematic representation of a preferred cross-sectional shape of the coil of the wire thread insert from FIG. 1, FIG. 6 is a schematic representation of the design of the outer wall of the wire thread insert from FIG. 1, FIG. 7 is a preferred perspective representation of a moldable wire thread insert with two fastening flanges, FIG. 8 is the preferred embodiment from FIG. 7 in a cut representation, FIG. 9 is a top view of a preferred wire thread insert with fastening flange and screw lock, FIG. 10 is a side view of the embodiment in FIG. 9, FIG. 11 is a preferred production of the wire thread insert with the help of a cutoff wheel, FIG. 12 is a schematic representation of a preferred winding spindle, FIGS. 13 A-C are schematic representations of a preferred molding of the wire thread insert with, without and with two fastening flanges in one component, FIG. 14 is a schematic representation of a preferred molding of the wire thread insert with fastening flange in one component, FIG. 15 is a flow chart of a preferred production of wire thread inserts and FIG. 16 is a flow chart in accordance with a preferred production of a component with wire thread insert.

DETAILED DESCRIPTION OF THE PREFERRED EMBODIMENTS

FIG. 1 shows a first preferred embodiment of a moldable wire thread insert 1. The wire thread insert 1 serves to reinforce screw-in openings of a component in order to avoid a mechanical overload of a component material during screwing in of a fastening element. For this purpose, the wire thread insert 1 comprises a cylindrical spiral 20. The cylindrical spiral 20 is spirally wound during the production of the wire thread insert 1 from a wire 10 (S1). The coils 30 wound with a certain slope of the cylindrical spiral 20 form a standard thread on the radial inner wall 22 of the cylindrical spiral 20. In accordance with different preferred embodiments, this standard thread is a metric or an imperial thread. The thread designed on the radial inside 22 of the cylindrical spiral 20 is determined through a cross-section 50 of the wire 10 and through the arrangement, in particular the slope, of the neighboring coils 30.

Since the wire thread insert 1 is moldable into a component to be produced, the cylindrical spiral 20 comprises a closed cylindrical circumferential spiral wall. In this manner, the wire thread insert 1 is surrounded by the component material during the filling (D) of a mold 90 during the component production without the component material getting inside the cylindrical spiral. In order to form a closed cylindrically circumferential spiral wall of the spiral 20, the neighboring coils 30 are arranged according to different embodiments of the wire thread insert 1. In accordance with a first embodiment, the wire 10 has a cross-section 50 shaped in any manner and the possible interspaces between neighboring coils 30 are sealed by means of a coating or sealing mass 80 (see FIG. 4).

The sealing mass 80 is sprayed on for example during the production of the wire thread insert 1 or applied through dipping of the wire thread insert 1. It is thus also preferred to provide the cylindrical spiral 20 on the inside 22 and the outside 24 with the sealing mass 80.

In accordance with a further preferred embodiment of the present invention, the cross-section 50 of the wire 10 of the wire thread insert 1 comprises a thread area 52 as well as an anchor area 54 (see FIG. 3). The thread area 52 and the anchoring area 54 are connected with each other via axial front surfaces 56 relating to the longitudinal axis of the cylindrical spiral 20. The front surfaces 56 are preferably designed planar so that opposite-lying front surfaces 56 of neighboring coils 30 lie against each other in a sealing manner. This is emphasized in the sectional enlargement in FIG. 3.

In accordance with an embodiment shown in FIG. 5, the opposite-lying front surfaces 56 are shaped such that they form a labyrinth seal. For this, the opposite-lying front surfaces 56 of neighboring coils 30 have for example a tongue and groove connection. Any other shape of the front surfaces 56 is conceivable, which fulfills the purpose of a labyrinth seal, for example a complementary shape of opposite-lying front surfaces 56.

According to the invention, the wire thread insert 1 comprises a fastening flange 40 on one end of the cylindrical spiral 20. The fastening flange 40 projects radially outwards over the spiral wall 22, 24 of the cylindrical spiral 20, as can be seen in FIGS. 1, 2 and 9. The fastening flange 40 is preferably formed by at least one coil 42. The coil 42 is wound with reduced or without slope compared to the other coils 30 of the spiral 20 on the end of the cylindrical spiral 20 (S2) so that the coil(s) 42 of the fastening flange 40 have a reduced and/or no slope compared to the slope of the spirals 20. On this constructive foundation, the fastening flange 40 comprises at least two coils 42 lying above each other in the radial direction of the cylindrical spiral 20. The radially outer coil 42 of the fastening flange 40 is designed at least partially, preferably completely, circumferentially around the spiral 20. Depending on the component material in which the fastening flange 40 should fasten the wire thread insert 1, the number of coils 42 lying above each other is selectable.

In accordance with a further preferred embodiment of the fastening flange 40, it has a first coil 42, which is connected to the end 28 of the cylindrical spiral 20 (see FIG. 7). The first coil 42 extends along a circumferential segment of the fastening flange 40, which extends over a certain angle γ (see FIG. 7). The angle γ has a minimum size of 180°, so that the first coil 42 in the shape of the circumferential segment extends around half of the cylindrical spiral 20 as seen in the circumferential direction. In another design of this embodiment, the circumferential segment of the first coil is designed larger so that it extends over an angle γ of 180° to 270° and more preferably of 180° to 360°. A further embodiment of the fastening flange 40 comprises a complete first coil 42. This means that the first coil 42 extends over a circumferential segment of the fastening flange 40 with an angle γ=360° starting at end 28 of the cylindrical spiral 20. A second coil 42 connecting to the first coil 42 also extends along a circumferential segment of the fastening flange 40. The circumferential segment of the second coil 42 starts at end 29 of the first coil 42 (FIG. 7). The circumferential segment of the second coil also extends over the angle γ, which is greater than 180°. The angle γ preferably comprises 180° to 270° and more preferably 180° to 360°.

In accordance with a further conceivable alternative, the fastening flange 40 extends over several coils 30 of the cylindrical spiral 20. In this case, the slope of the coils 42 of the fastening flange 40 is opposite the slope of the cylindrical spiral 20. It is also preferred that the fastening flange 40 merges into a fastening spiral (not shown), which extends over a part or the entire length of the cylindrical spiral 20. Preferably, neighboring coils of the fastening spiral do not lie against each other so that component material can get in between and ensures an additional fastening of the wire thread insert 1 in the component.

Due to its shape, the fastening flange 40 forms a contact surface 44, which is arranged perpendicular to the center axis of the cylindrical spiral 20 (see FIG. 2). Based on this geometry, it is no longer required to grind off the front side of the wire thread insert 1 with fastening flange 40 in order to create an even contact surface, for example in a mold 90 for component production. The contact surface 44 makes it easier for a worker to seal the front side of the wire thread insert during component production. The fastening flange 40 also serves as a positioning aid when it is mounted on a pin 92 of a mold 90 for component production (step B, see FIGS. 8, 9, 11). In its installed state, the fastening flange 40 has the further advantage that radial tensions, which occur through the screwing in and tightening of a screw in the wire thread insert 1, are shifted further in the direction of the cylindrical spiral 20 and thus into the component. In this manner, the critical overlapping of compression stresses, for example through a screw-on part on the component and the radial tensions on the thread flanks of the wire thread insert 1, is reduced. Furthermore, the fastening flange 40 advantageously serves as a constructive support during mounting and insertion of a fastening element into the wire thread insert 1 molded into the component. Furthermore, the fastening flange 40 represents a unique sorting criterion based on its larger diameter compared to the cylindrical spiral 20, with the help of which automated handling of the wire thread insert 1, for example during assembly of the mold 90 for component production, is facilitated.

In accordance with a further preferred embodiment, a fastening flange 40 is provided on each respective end of the cylindrical spiral 20. This preferred embodiment is shown in FIG. 7 in a perspective view as well as in FIG. 8 in a perspective cut representation. Coils 42, which form the fastening flange 40 are arranged respectively on both ends of the cylindrical spiral 20 with closed spiral wall. The coils 42 of the fastening flange are also arranged radially outwards compared to the closed spiral wall.

While the production of the moldable wire thread insert 1, mechanical tensions are imprinted into the wire 10 in the axial direction of the wire thread insert 1, which work against each other to cause a pulling together of the coils 30, 42. In this manner, neighboring coils 30 and 42 are adjacent to each other in order to seal the interior of the moldable wire thread insert 1 from its environment. This pulling together and adjacency of neighboring coils 30, 42 are also detectable in the perspective cut representation in FIG. 8. While the axial front sides 56 of the coils 30 are preferably adjacent to each other in the area of the cylindrical spiral 20, the flanks of the thread area 52 partially lie against the flanks of the anchoring area 54 in the area of the fastening flange 40. Even if the flanks of the thread area 52 and the anchoring area 54 are only adjacent at selected points, the coils 42 of the fastening flange 40 are arranged such that they form a labyrinth seal. This labyrinth seal prevents a penetration of material, for example plastic, into the interior of the moldable wire thread insert. This applies in the same way for wire thread inserts 1 with one or two fastening flanges 40.

In accordance with a further preferred embodiment, the cylindrical spiral 20 of the moldable wire thread insert 1 comprises at least one coil 38, which serves as a securing device for a screw screwed into the wire thread insert 1 (not shown). It is also preferred to provide a plurality of these coils 38. As can be seen in FIG. 9, the coil 38 constricts the inner diameter of the cylindrical spiral 20 in a secant-like manner. Although clamping torques for a screw to be screwed into the wire thread insert 1 (not shown) need to be achieved, it must also be ensured that no separation distances occur between neighboring coils 38 and 30 of the cylindrical spiral 20, which enable a penetration of material, such as e.g. plastic, into the interior of the moldable wire thread insert 1. The smallest diameter, which is formed by a coil 38, is thus calculated according to the following formula. It is equal to a core diameter of the internal thread to be formed by the wire thread insert 1 minus a tenth of the nominal diameter of the internal thread to be formed by the wire thread insert 1. When taking this formula into consideration, it is preferably ensured that both a sufficient clamping of a screw to be screwed in is given and a penetration of a material, into which the wire thread insert 1 is molded, is prevented. A side view of the moldable wire thread insert 1 with coil 38 is shown in FIG. 10.

The moldable wire thread insert 1 of the present invention comprises alternatively or supplementarily to the fastening flange 40 one end of the cylindrical spiral 20, which is designed in a planar manner. This end of the cylindrical spiral designed in a planar manner forms an even axial front surface of the cylindrical spiral and thus of the wire thread insert 1, in order to support for example a positioning of the wire thread insert 1. A corresponding wire thread insert 1 without fastening flange 40 is shown in FIG. 3. The last coil 30 on one or both ends of the cylindrical spiral 20 is designed in a planar manner so that the contact surface 36. During the production of the wire thread insert 1, the contact surface 36 is created through the grinding off of individual wire thread inserts 1 or through the cutoff grinding of the endless wire thread insert 3 (S5, see FIG. 7).

For the preferred fastening of the wire thread insert 1 in the component material, the radial outer wall 24 of the cylindrical spiral 20 comprises at least one groove 26 running in the longitudinal direction of the cylindrical spiral 20. A plurality of such grooves 26 are preferably provided on the radial outside 24. An example of such a groove 26 is shown in FIG. 6. In the case of component production with moldable wire thread insert 1, the component material penetrates into the groove 26 and in this manner forms an undercut, which stabilizes the wire thread insert against possible twisting. Any shapes that fulfill this function are conceivable for the groove 26. Thus, the groove is for example angular, slotted or similarly shaped. In accordance with FIG. 6, the groove 26 runs in a straight line in the axial direction of the spiral 20. It is also preferred to provide a curvilinear progression of the groove 26. The groove 26 also runs in an interrupted line or consists of segments offset laterally with respect to each other.

Depending on the component material, the cross-section 50 of the wire 10 or respectively of the coils 30 of the cylindrical spiral 20 is symmetrically (see FIG. 5) or asymmetrically shaped (see FIGS. 3 and 4). In the case of a symmetrical cross-section 50, the thread area 52 and the anchoring area 54 have the same shape. In the case of an asymmetrical cross-section 50, the shapes of thread area 52 and anchoring area 54 are different. The anchoring area 54 is preferably designed in an acute-angled manner so that the anchoring area 54 penetrates as far as possible into the component material. In this manner, the wire thread insert 1 forms a larger thrust cylinder compared to the symmetrical cross-section 50 of the coils 30, whereby the pullout stability of the wire thread insert out of the component material is increased. In order to realize this advantage, the two flanks of the anchoring area 54 preferably form an angle $\alpha<60°$. In this connection, it is further preferred that the angle $\alpha$ has a size of 30° through 40°.

In accordance with a further preferred embodiment, the wire thread insert 1 on its end facing away from the fastening flange 40 comprises a tang 34 penetrating radially into the spiral 20, as shown in FIG. 9. During the production of the component, the tang 34 preferably serves as a depth stop of the wire thread insert 1 on the pin 92 of the mold 90 (see FIG. 14). The wire thread insert 1 is thereby mounted on the pin 92 and holds its position on the pin 92 and thus in the mold 90 due to tang 34. During filling of the mold 90 with component material (step D), the tang 34 is also enclosed. After the hardening of the component material, the surrounded tang 34 contributes to the further stabilization and fastening of the wire thread insert 1 in the component.

It is also preferred to forgo the tang 34 or to remove the tang 34 after the molding of the wire thread insert 1 into a component so that the wire thread insert 1 has a free through hole opening on its end facing away from the fastening flange 40. This free through hole opening is significant when the wire thread insert 1 reinforces a through hole in the component. In this case, a screw can protrude out for the fastening of an addon part after the screwing into the through hole on the through hole opening of the wire thread insert 1.

For the production of the wire thread insert, a winding spindle 70 is preferably used, as is shown in FIG. 12. The winding spindle 12 comprises a first cylindrical area 72 as well as a second area 74 radially expanded in comparison to the cylindrical area 72. In accordance with FIG. 12, the end of the first area 72 facing the second expanded area 74 preferably has a notch 76. This notch 76 serves to receive the end of the wire 10 to be wound in order to form the already aforementioned radially inwards projecting pin 34.

Within the second area 74, the winding spindle 70 expands out of the first area 72 radially outwards. This expansion preferably takes place along a surface continuously or gradually. FIG. 12 shows a gradual expansion, in which thread-like depressions are worked into the second expanded area 74, too. The expanded area 74 has an outer surface similar to the shell surface of a cone, which is arranged at a certain angle $\alpha$ to the longitudinal axis L of the winding spindle. The angle $\alpha$ assumes values in the area of 90° to 140°, preferably 100° to 120°. In accordance with a preferred embodiment, the angle is $\alpha=90°$. In this case, the second area 74 is formed through a ledge compared to the first cylindrical area 72, which is indicated in its mold by the dashed line in FIG. 12.

For the production of the fastening flange 40, an angle $\alpha>90°$ is preferred in order to make the second expanded area 74 available for the winding spindle 70. During the production of the moldable wire thread insert 1, the wire 10 is preferably fed perpendicular to the longitudinal axis L in the direction of the wire feed direction DZ (see FIG. 12) to the winding spindle 70. In the case shown schematically in FIG. 12, the wire 10 is fed to the winding spindle 70 at an angle $\beta=90°$ to the longitudinal axis L. It is also preferred to include an angle $\beta$ greater or less than 90° between the wire feed direction DZ and the longitudinal axis L of the winding spindle in the winding direction of the wire thread insert 1—i.e. from the first area 72 to the second area 74. It is ensured with the help of this alignment of the feed direction DZ to the longitudinal axis L of the winding spindle 70 that mechanical tensions are molded or respectively embossed into the wire 10 of the wire thread insert 1 during the winding of the moldable wire thread insert 1 in a targeted manner.

During the winding of the moldable wire thread insert 1, the winding spindle 70 is shifted in the advance direction V (see arrow in FIG. 12) relative to the wire 10 or respectively its feed position in the wire feed direction DZ. It is also conceivable that only the wire 10 is shifted relative to the longitudinal axis L of the winding spindle 70 or that both the winding spindle 70 as well as the wire 10 are simultaneously shifted relative to each other in order to wind the moldable wire thread insert 1.

A preferred embodiment of the production of the wire thread insert 1 is shown in the flow chart in FIG. 15. The wire is thereby preferably made of a light metals or steel or stainless steel or copper or brass. While metals with corrosion protection are preferred, it is also conceivable to not use corrosion-protected metals. Wires 10 without corrosion protection to which corrosion protection is applied after the winding can also be used.

The moldable wire thread insert 1 is preferably produced with the help of the winding spindle 70 already described above (see FIG. 12). In a first preferred step S1, the endless wire 10 is fastened in the notch 76 of the winding spindle 70 in order to form the radially inward sticking tang 34. After this, the winding of the wire 10 to the cylindrical spiral 20 begins along the first cylindrical area 72 of the winding spindle 70 (step S2). For this purpose, the first cylindrical area 72 of the winding spindle 70 comprises a thread, which specifies mainly the later shape of the inner thread of the moldable wire thread insert 1. The cylindrical spiral 20 is shaped on the first cylindrical area 72 with a certain diameter according to the planned thread of the wire thread insert 1. In addition to the diameter, the coils 30 of the cylindrical spiral 20 also have a first slope, which is specified by the thread on the first cylindrical area 72.

After the cylindrical spiral 20 has been wound onto the first cylindrical area 72, the wire 10 is wound on or against the second expanded area 74 of the winding spindle 70. In this manner, the fastening flange 40 projecting radially outwards over the spiral wall 22, 24 is created on one end of the spiral 20 (step S3A). Alternatively to the creation of a fastening flange, it is also preferred to surface-grind the cylindrical spiral 20 on at least one end, preferably in that the cylindrical spiral is separated into at least two parts through cutoff grinding (step S3B). This process is explained in greater detail below.

In accordance with a first embodiment, the fastening flange 40 is produced with the help of the winding spindle 70, which has the second expanded area 74 in the shape shown in FIG. 12. The wire 10 is wound on the second area 74 in order to form the coils 42 of the fastening flange 40. Compared to the coils 30 of the cylindrical spiral 20, the at least one coil 42 of the fastening flange 40 wound on the area 74 has a lesser slope and a greater diameter. The wire 10 is preferably wound onto the second expanded area 74 of the winding spindle 70 such that after a cutting of the wire 30 off of the wound wire thread insert 1, preferably through a stamping process, and the unspindling (step S5) of the wire thread insert 1 from the winding spindle 70 the end of the spiral 20 has the fastening flange 40 described above. The fastening flange 40 comprises at least one coil 42 extending in the radial direction over the cylindrical spiral 20, which runs along a circumferential segment with an angle $\gamma$. The fastening flange 40 preferably comprises two coils 42 lying above each other in the radial direction. It is furthermore preferred that the radially outer coil 42 of the fastening flange 40 extends along a circumferential segment with the angle $\gamma<360°$ subsequent to the first coil 42 of the fastening flange 40. It is also preferred to create one or two coils 42 of the fastening flange 40, which extend over a certain circumferential segment as described above.

In order to wind the wire thread insert 1, the winding spindle 70 is preferably moved in the advance direction V (see FIG. 12). Meanwhile, the feed position of the wire 10 with feed direction DZ remains constant. The feed or offset V of the winding spindle 70 is set depending on the slope of the thread to be wound on the cylindrical area 72.

During the winding of the wire thread insert 1, the wire 10 is preferably fed at an angle $\beta$ to the longitudinal axis L of the winding spindle 70 (see FIG. 12). The angle $\beta$ is formed by the wire feed direction DZ and the longitudinal axis L of the winding spindle 70 in the winding direction of the wire thread insert—i.e. against the advance direction V of the winding spindle 70. The angle β is preferably ≥90° in order to emboss mechanical stress into the wire 10 of the wire thread insert. This mechanical stress in the wire 10 of the wire thread insert 1 ensures that neighboring coils 30, 42 are adjacent to each other after the unspindling of the wire thread insert 1 from the winding spindle 70. In this manner, a wire thread insert 1 wound on a block is provided, the interior of which is sealed from penetration of for example plastic from the outside during production of a component and molding of the wire thread insert.

Moreover, the wire 10 is preferably supplied with a tensile strength in its longitudinal direction during the winding of the wire thread insert 1 so that deformations of the wire 10 can be created outside the elastic area. This procedure ensures that a moldable wire thread insert 1 wound on a block is also present after the unspindling of the wire thread insert from the winding spindle 70.

The cylindrical spiral 20 of the completed wire thread insert 1 should provide an internal thread with a nominal slope. In order to achieve this, the thread 73 of the first area 72 of the winding spindle 70 is preferably designed with an overslope. In this case, an overslope means that the slope of the thread 73 is greater than the nominal slope of the internal thread of the later cylindrical spiral 20. If one assumes based on FIG. 12 a constant, vertical feed position of the wire 10 during winding of the cylindrical spiral 20 on the thread 73, the winding spindle 70 is moved by a certain amount in the axial advance direction V per revolution during the winding of the cylindrical spiral 20. If the slope of thread 73 matches the nominal slope of the later cylindrical spiral 20, the winding spindle 70 is preferably moved in the advance direction V per revolution with winding spindle with the nominal slope.

In accordance with another preferred alternative, in which the thread 73 has the over slope discussed above, the winding spindle 70 is moved in the case of a constant wire feed position in advance direction V by an amount smaller than the over slope of the thread 73 per revolution. This amount corresponds for example to the nominal slope of the thread of the later cylindrical spiral 20. Due to this advancement or respectively offset of the winding spindle 70 in the axial direction per revolution, the wire 10 is fed at an angle β>90° (see FIG. 12) to the first area 72 of the winding spindle 70. This combined forcible guiding of the wire 10 through the thread 73, the axial advancement of the winding spindle 70 and the resulting angle β embosses the inner mechanical tension described above into the moldable wire thread insert 1.

The one or more coils 42 of the fastening flange 40 are preferably created with the help of the second area 74 of the winding spindle 70, which has the thread 75. In accordance with another preferred process, the thread 75 is designed with an under-slope compared to the nominal slope of the internal thread of the later cylindrical spiral 20. In this case, under-slope means that the slope of the thread 75 is less than the nominal slope of the cylindrical spiral 20. If the wire 10 is wound onto the second area 74 of the winding spindle 70 in the case of the constant feed position in the feed direction DZ onto the second area 74, the winding spindle 70 is moved in the advance direction per revolution by a certain amount. This amount is preferably less than the under slope of the thread 75 so that mechanical tensions are embossed into the wire thread insert 1 in a similar manner, as described above. This embossed mechanical tension ensures that the one or more coils 42 of the fastening flange 40 are arranged in almost one plane at the end of the cylindrical spiral 20 after the completion of the wire thread insert 1.

It is also conceivable to change the feed position of the wire 10 with respect to the winding spindle 70 in the feed direction V while the winding spindle 70 retains its axial position.

According to another preferred alternative of the present production method, the second area 74 of the winding spindle 70 has a ledge against which the wire 10 is wound. As soon as the wire 10 is wound against the ledge 74 (see FIG. 12), the coils 42 of the fastening flange 40 arrange themselves next to each other with partial overlapping in order to form the fastening flange 40.

It is furthermore preferred to create groove 26 running in the axial direction on a radial outside of the spiral 20 after the winding of the wire 10 onto the winding spindle 70. In accordance with one alternative, this is realized by means of milling.

The wire thread insert 1 is then unspindled from the winding spindle 70 (S5). After the unspindling, the neighboring coils 30, 42 lie adjacent such that a wire thread insert 1 wound on a block is present. In this manner, a regular thread is preferably formed on the inside of the wire thread insert 1, which is sealed towards the outside. It is also preferred to form a special thread on the inside, such as for example a fine thread, a trapezoidal thread, a course thread or the like.

In accordance with another alternative, one end of the cylindrical spool 20 is surface-ground instead of or in addition to the fastening flange 40 (see step S3B). In order to realize this, an endless wire thread insert 3 is first wound on a mandrel 100 in accordance with a production route (see FIG. 11). The pin 100 is designed for example in two parts so that a passage can be formed between the two neighboring parts of the mandrel 100. A cutoff wheel 105 is then moved by the penetration of the two mandrel parts 100 and in this way separates the wire thread insert 3 into two parts in the arrow direction of the left illustration in FIG. 7. Once the cutoff wheel 105 has returned to its initial position in accordance with the right illustration in FIG. 7 (see arrow), two wire thread inserts 1 each with planar end 36 are present.

The production method for producing a component with molded wire thread insert 1 is explained in greater detail with respect to the flow chart in FIG. 11 and the illustration in FIGS. 8 and 9. The component (not shown) is for example made of plastic through injection molding or of metal through a suitable casting process. Other production processes are also suitable for a component with which the wire thread insert 1 is moldable.

A mold 90 consisting of the two mold halves 94 and 96 for the production of a component with molded wire thread insert 1 is shown as an example in FIGS. 13 and 14. The mold half 94 comprises the pin 92, on which the wire thread insert 1 is positioned (steps A, B). In accordance with a first preferred alternative, the wire thread insert 1 is mounted on the pin 92 and glides on the surface of the pin 92 until it rests on a contact surface. For this purpose, the pin 92 has no thread (step B). In accordance with a further alternative, the wire thread insert 1 is screwed or spindled onto the pin 92 since it has on its outside an external thread fitting the internal thread of the wire thread insert 1 (step A).

FIG. 13 shows that the wire thread insert 1 should reinforce a through hole opening in the component. Once the component material has been added to the mold 90 so that it fills in the hollow spaces between the mold halves 94 and 96, the component material hardens. After the step of filling the mold (D) and the hardening of the component material, the component is removed from the mold 90 in step E.

In the production alternative shown in FIG. 14, the wire thread insert 1 supports itself via tang 34 on pin 92 of mold 90. After filling the mold 90 with for example metal or plastic, the component material hardens so that the wire thread insert 1 reinforces an opening in the component that is closed on one side.

In FIGS. 13 and 14, it is also conceivable that either the contact surface 36 or the fastening flange 40 guarantees that on one side the wire thread insert 1 ends adjacent to a component surface, the wire thread insert 1 in the mold 90 is precisely positioned and an additional sealing of the inside of the wire thread insert 1 also takes place adjacent to the mold half 94.

SUMMARY OF PREFERRED EMBODIMENTS

1. Moldable wire thread insert (1) for reinforcing a screw-in opening of a component, which has the following characteristics:
   a. a cylindrical spiral (20) made of a helically, wound wire (10), whose
   b. neighboring coils (30) are arranged such that a closed cylindrical spiral wall (22, 24) is present, while
   c. at least one end of the cylindrical spiral (20) has a fastening flange (40), which extends radially outwards over the cylindrical spiral wall (22, 24) and with which the wire thread insert (1) is anchorable in the component, and/or one end of the cylindrical spiral (20) is designed in a planar manner in order to form an even, axial front surface (36) of the cylindrical spiral.

2. The wire thread insert (1) according to 1, the fastening flange (40) of which comprises at least one flange coil (42) of the wound wire (10), which has a reduced, preferably no, slope compared to the cylindrical spiral (20).

3. The wire thread insert (1) according to 2, which comprises a first coil (42), which extends along a circumferential segment of the fastening flange (40) starting at the end (28) of the cylindrical spiral (20) over an angle γ of at least 180°, preferably 180° to 270° and more preferably of 180° to 360°.

4. The wire thread insert (1) according to 3, which comprises a complete first coil (42) and a second coil (42), which extends along a circumferential segment of the fastening flange (40) starting at the end (29) of the first coil (42) over an angle γ of at least 180°, preferably 180° to 270° and more preferably of 180° to 360°.

5. The wire thread insert (1) according to 1, the fastening flange (40) of which comprises at least two coils (42) of the wound wire (10) lying above each other in the radial direction of the cylindrical spiral (20), wherein the radially outer coil (42) of the fastening flange (40) is designed circumferentially at least partially, in particular completely, around the spiral (20).

6. The wire thread insert (1) according to one of the previous 1-5, the cylindrical spiral wall (22, 24) of which has at least one groove (26) running in the longitudinal direction of the cylindrical spiral (20) on a radial outside (24), preferably having a plurality of grooves (26).

7. The wire thread insert (1) according to 1, the wire (10) of which has a cross-section (50) shaped such that the closed cylindrical spiral wall (22, 24) has a standard thread, preferably a metric or imperial internal thread, on a radial inside (22).

8. The wire thread insert (1) according to 1, in which a cross-sectional profile (50) of the wire has an angle contour (54) with two flanks radially outwards with respect to the cylindrical spiral (20), which form an angle α<60°, preferably an angle between 30° and 40°.

9. The wire thread insert (1) according to 8, the wire cross-section (50) of which is designed asymmetrically with respect to a radial inside (22) and outside (24) of the spiral wall (20).

10. The wire thread insert (1) according to 1, the end of the spiral (20) of which has a radial inwards protruding tang (34) or a free through hole opening across from the end with the fastening flange (40).

11. The wire thread insert (1) according to 1, in which a cross-section (50) of the wire (10) has front surfaces (56) in the axial direction of the spiral (20) so that front surfaces (56) of neighboring coils (30) are adjacent to each other.

12. The wire thread insert (1) according to 11, the front surfaces (56) of neighboring coils (30) of which are shaped complementarily to each other.

13. The wire thread insert (1) according to one of 1 to 12, which consists of a light metal alloy or steel or stainless steel or copper or brass.

14. A component made of plastic or metal, in which a wire thread insert (1) is molded according to one of 1 through 11.

15. A production method for a moldable wire thread insert (1) for reinforcing a screw-in opening of a component, which has the following steps:
   a. winding of a wire (10) into a cylindrical spiral (20) (S2) with a diameter such that neighboring coils (30) of the cylindrical spiral (20) have a first slope and form a cylindrical spiral wall (22, 24),
   b. creation of a fastening flange (40) protruding radially outwards over the spiral wall (22, 24) on at least one end of the spiral (20) (S3A) or
   c. planar grinding of the cylindrical spiral (20) on at least one end of the spiral (20), preferably cutoff grinding of the cylindrical spiral (20) (S3B).

16. The production method according to 15, with the further step:
   winding of at least one coil (30) of the spiral (20) on one end of the spiral (20) (S2A) with a slope reduced compared to the first slope, in order to form the fastening flange (40).

17. The production method according to 16, which further comprises:
   winding of the fastening flange (40) such that the fastening flange (40) has a greater diameter than the spiral (20), in particular in that the end of the spiral (20) comprises at least two coils (42) (30) of the wound wire (10) lying above each other in the radial direction of the cylindrical spiral (20).

18. The production method according to 15, with the further step:
   winding of the wire (10) onto a winding spindle (70), wherein the winding spindle (70) comprises a first cylindrical area (72) for winding the cylindrical spiral (20) and a second area (72) extended in the radial direction compared to the first cylindrical area (72) for winding the fastening flange (40).

19. The production method according to 18, with the further step:
   winding of the fastening flange (40) such that the wire (10) is wound on the second extended area (74) of the winding spindle (70), which extends constantly or gradually, or such that the wire (10) is wound against the second extended area (74), which represents a ledge compared to the first cylindrical area (72).

20. The production method according to 18 or 19, with the further step:
   winding of the wire (10) onto the winding spindle (70) such that a longitudinal axis (L) of the winding spindle (70) in the angle direction of the wire thread insert (1) and a wire feed direction (DZ) of the wire (10) to be wound form an angle β≧90°.

21. The production method according to 15, with the further step:

offsetting of the winding spindle (70) and of the wire (10) to be fed relative to each other with different speed during the winding of the wire (10) onto the first (72) and the second area (74) of the winding spindle (70).

22. The production method according to 15, with the further step:

unspindling (S5) of the cylindrical spiral (20) with fastening flange (40) from a winding spindle (70) so that neighboring windings (30) of the spiral (20) and preferably of the fastening flange (40) lie next to each other in a sealing manner.

23. The production method according to 15, with the further step:

hooking (S1) of the wire (10) to be wound into a notch (76) of the winding spindle (70) and creation of a radially inwards sticking tang (34) on the end of the spiral (20) facing away from the flange onto the winding spindle (70) through the winding up of the wire (10).

24. The production method according to 15, with the further step:

creation of at least one groove (26) running in the axial direction on a radial outside (24) of the spiral (20) (S4), preferably by means of milling.

25. A production method for a component with a molded wire thread insert (1), which has a cylindrical spiral (20) formed from a helically, wound wire (10), of which at least one end comprises a fastening flange (40), which extends radially outwards over the cylindrical spiral (20), in particular a wire thread insert (1), wherein the component is made of plastic or metal and the method has the following steps:

a. positioning (A, B) of the wire thread insert (1) on a pin (92), b. arranging (C) of the pin (92) with wire thread insert (1) in a mold (90) such that, after demolding of the component from the mold, the fastening flange (40) is arranged adjacent to a component surface, c. filling (D) of the mold (90) with metal or plastic and d. demolding of the component (E) with wire thread insert (1) from the mold (90).

26. The production of a component according to 25, which has in a further embodiment of step a:

spindling (A) of the wire thread insert (1) onto the pin (92), which has a thread fitting the wire thread insert (1), or mounting (B) of the wire thread insert (1) onto a pin (92) without thread.

27. The production of a component according to 25, which has in a further embodiment of step c:

injection molding (D) of plastic in the mold (90) for producing the component.

28. A winding spindle (70) for winding a moldable wire thread insert (1), which has the following characteristics:

a. a first cylindrical area (72) with a thread and b. a second area (74), which is expanded in the radial direction compared to the first area (72) so that a fastening flange (40) of the moldable wire thread insert (1) is producible with the help of the second area (74).

29. The winding spindle (70) according to claim 28, the second expanded area (74) of which is constantly or gradually expanded compared to the first area (72).

30. The winding spindle (70) according to 28, the second expanded area (74) of which is designed as a single level and represents a ledge compared to the first cylindrical area (72).

31. The winding spindle (70) according to 28, which has a notch (76) on one end of the first cylindrical area (72), in which a wire (10) to be wound is fastenable in order to form a radially inward sticking tang (34) during the winding of the wire thread insert (1).

32. The winding spindle (70) according to 28, the second area of which is arranged at an angle of 90° to 120° to the longitudinal axis of the winding spindle (70).

The invention claimed is:

1. A production method for a moldable wire thread insert for reinforcing a screw-in opening of a component, said method comprising the steps of:

a) helically winding a wire onto a first cylindrical area of a winding spindle into a cylindrical spiral with a diameter such that neighboring coils of the cylindrical spiral have a first slope and form a cylindrical spiral wall, and while helically winding the wire imprinting mechanical tensions into the wire in an axial direction of the wire thread insert so that the neighboring coils are wound on a block after removing the wire thread insert from the winding spindle, b) after the helically winding step, creating a fastening flange by winding the wire into a second area of the winding spindle, in which the winding spindle expands out of the first cylindrical area radially outwards along an outer shell surface of a cone wherein the outer shell surface extends continuously or gradually, the fastening flange protruding radially outwards over the cylindrical spiral wall on at least one end of the spiral through winding of at least one coil of the spiral on one end of the spiral with a reduced slope compared to the first slope, in order to create the fastening flange, and c) winding the fastening flange such that the fastening flange has a greater diameter than the cylindrical spiral, wherein the end of the spiral comprises at least two coils of the wound wire lying above each other in the radial direction of the cylindrical spiral.

2. The production method according to claim 1, comprising the further step of:

winding the wire onto the winding spindle such that a longitudinal axis of the winding spindle and a wire feed direction of the wire to be wound form an angle β≧90°.

3. The production method according to claim 1, comprising the further step of:

advancing the winding spindle and the wire to be fed relative to each other with different speeds during the winding of the wire onto the first and the second area of the winding spindle.

4. The production method according to claim 1, comprising the further step of:

removing the cylindrical spiral with the fastening flange as wound onto the winding spindle from the winding spindle such that neighboring windings of the spiral and the fastening flange rest against each other.

5. The production method according to claim 1, comprising the further step of:

hooking the wire to be wound into a notch of the winding spindle and creating a radially inwards sticking tang on the end of the spiral facing away from the flange onto the winding spindle through the winding up of the wire.

6. The production method according to claim 1, comprising the further step of:

creating at least one groove running in an axial direction on a radial outer wall of the spiral by milling.

7. The production method according to claim 1, wherein a cross-section of said wire comprises a thread area and an anchoring area.

8. A production method for a moldable wire thread insert for reinforcing a screw-in opening of a component, said method comprising the steps of:
- a) helically winding a wire onto a first cylindrical area of a winding spindle into a cylindrical spiral with a diameter such that neighboring coils of the cylindrical spiral have a first slope and form a cylindrical spiral wall, and while helically winding the wire imprinting mechanical tensions into the wire in an axial direction of the wire thread insert so that the neighboring coils are wound on a block after removing the wire thread insert from the winding spindle,
- b) after the helically winding step, creating a fastening flange by winding the wire into a second area of the winding spindle, in which the winding spindle expands out of the first area of the winding spindle radially outwards forming a ledge compared to the first cylindrical area, and winding the wire against the ledge so that the coils of the fastening flange arrange themselves radially next to each other with partial overlapping in order to form the fastening flange,
- the fastening flange protruding radially outwards over the spiral wall on at least one end of the spiral through winding of at least one coil of the spiral on one end of the spiral with a reduced slope compared to the first slope, in order to create the fastening flange, and
- c) winding the fastening flange such that the fastening flange has a greater diameter than the cylindrical spiral, wherein the end of the spiral comprises at least two coils of the wound wire lying above each other in the radial direction of the cylindrical spiral.

9. The production method according to claim 8, comprising the further step of:
- winding the wire onto the winding spindle such that a longitudinal axis of the winding spindle and a wire feed direction of the wire to be wound form an angle $\beta \geq 90°$.

10. The production method according to claim 8, comprising the further step of:
- advancing the winding spindle and the wire to be fed relative to each other with different speeds during the winding of the wire onto the first and the second area of the winding spindle.

11. The production method according to claim 8, comprising the further step of:
- removing the cylindrical spiral with the fastening flange as wound onto the winding spindle from the winding spindle such that neighboring windings of the spiral and the fastening flange rest against each other.

12. The production method according to claim 8, comprising the further step of:
- hooking the wire to be wound into a notch of the winding spindle and creating a radially inwards sticking tang on the end of the spiral facing away from the flange onto the winding spindle through the winding up of the wire.

13. The production method according to claim 8, comprising the further step of:
- creating at least one groove running in an axial direction on a radial outer wall of the spiral by milling.

14. The production method according to claim 8, wherein a cross-section of said wire comprises a thread area and an anchoring area.

* * * * *

UNITED STATES PATENT AND TRADEMARK OFFICE
CERTIFICATE OF CORRECTION

PATENT NO. : 10,005,211 B2
APPLICATION NO. : 14/498337
DATED : June 26, 2018
INVENTOR(S) : Klaus Friedrich Grubert et al.

Page 1 of 1

It is certified that error appears in the above-identified patent and that said Letters Patent is hereby corrected as shown below:

On the Title Page

<u>Item (71) Applicants:</u>
Change "Klaus Friedrich Grubert, Michael Stumpf, Xavier Sutz and Jochen Rintelmann" to --Böllhoff Verbindungstechnik GmbH--

<u>Item (56) References Cited:</u>
OTHER PUBLICATIONS:
Add --Japanese Office Action for JP 2012-531289; mailed June 3, 2014; 4 pages--
Add --Meyers Great Conversation Encyclopedia Webpage; http://www.zeno.org/Meyers-1905/A/Feder+%5B1 %5D; Leipzig 1906; vol. 6; pages 372-374; July 9, 2010--
Add --Chinese Patent Office and Search Report for Chinese Application No. 201080051942.2; dated June 25, 2013; 3 pages--

Signed and Sealed this
Thirteenth Day of November, 2018

Andrei Iancu
*Director of the United States Patent and Trademark Office*